(12) United States Patent
Ikarashi

(10) Patent No.: US 12,192,339 B2
(45) Date of Patent: Jan. 7, 2025

(54) SECURE COMPUTATION APPARATUS, SECURE COMPUTATION METHOD, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 275 days.

(21) Appl. No.: 17/792,147

(22) PCT Filed: Jan. 20, 2020

(86) PCT No.: PCT/JP2020/001680
§ 371 (c)(1),
(2) Date: Jul. 12, 2022

(87) PCT Pub. No.: WO2021/149103
PCT Pub. Date: Jul. 29, 2021

(65) Prior Publication Data
US 2023/0101710 A1 Mar. 30, 2023

(51) Int. Cl.
*H04L 9/08* (2006.01)
(52) U.S. Cl.
CPC .......... *H04L 9/085* (2013.01); *H04L 2209/46* (2013.01)

(58) Field of Classification Search
None
See application file for complete search history.

(56) References Cited

U.S. PATENT DOCUMENTS

2019/0212986 A1\* 7/2019 Araki ................ G09C 1/00

FOREIGN PATENT DOCUMENTS

EP 3866142 B1 \* 12/2023 ............. G06F 7/544

OTHER PUBLICATIONS

Liina Kamm et al., "Secure floating point arithmetic and private satellite collision analysis", International Journal of Information Security (IJIS), 2015, vol. 14, pp. 531-548, total 18 pages.

(Continued)

*Primary Examiner* — Fatoumata Traore
(74) *Attorney, Agent, or Firm* — XSENSUS LLP

(57) ABSTRACT

A secret share value $[f_t(x)-f'_t(x)]$ of $f_t(x)-f'_t(x)$ is obtained through secure computation using a secret share value $[x]$ of a real number x, and a secret share value $[f_t(x)-f'_t(x)]_r$ of $(f_t(x)-f'_t(x))_r$ obtained by right-shifting $f_t(x)-f'_t(x)$ by the predetermined number of bits is obtained through secure computation using the secret share value $[f_t(x)-f'_t(x)]$. Here, $[\mu]$ is a secret share value of $\mu$, n is an integer equal to or greater than 1, $t=0,\ldots,n-1$, $u=1,\ldots,n-1$, $f_t(x)$ is a function of the real number x, $f'_t(x)$ is an approximation function of the function $f_t(x)$, a secret share value $[f'_0(x)]$ of an approximation function $f'_0(x)$ is $[f'_0(x)]=c_{0,0}+c_{0,1}[x]$, a secret share value $[f'_u(x)]$ of an approximation function $f'_u(x)$ is $[f'_u(x)]=c_{u,0}+c_{u,1}[x]+c_{u,2}[f_0(x)]+\ldots+c_{u,u+1}[f_{u-1}(x)]$, $c_{t,0}$ is a public value, and $c_{t,1},\ldots,c_{t,n+1}$ are coefficients.

12 Claims, 6 Drawing Sheets

(56) References Cited

OTHER PUBLICATIONS

Liisi Kerik et al., "Optimizing MPC for Robust and Scalable Integer and Floating-Point Arithmetic", 18th International Conference, 2016, pp. 271-287, total 17 pages.
Ohata "Reconsidering Privacy-Preserving Deep Neural Networks", 2018 Symposium on Cryptography and Information Security, The Institute of Electronics, Information and Communication Engineers, Jan. 23, 2018, 3F-1, 20 pages including English Translation.
Cartina et al., "Secure Computation with Fixed-Point Numbers", LNCS, Financial Cryptography and Data Security, vol. 6052, Springer, 2010, pp. 35-50.
Ikarashi, "Secure Real Number Operations for Secure AI-O(|p|)-Bit Communication and O(1)-Round Right Shift Protocol-", CSS2019, 2019, 16 pages including English Translation.
Octavian Catrina, et al., "Secure Computation With Fixed-Point Numbers", Dept. of Computer Science, University of Mannheim, Germany, Jan. 2010, 17 pages.

* cited by examiner

| PARAMETERS | RECIPROCAL | SQUARE ROOT | RECIPROCAL OF SQUARE ROOT | EXPONENT | LOGARITHM |
|---|---|---|---|---|---|
| L | 0.75 | 1 | 0.5 | 0 | 2 |
| R | 1.125 | 2 | 1 | 2 | 4 |
| a | -2.110464393923928 | -0.428141400291061 | -1.696628555353 | 0.015024536390913 | -0.846696273121107 |
| b | 2.434960779969272 | 0.410120079876874 | 1.549574093768 | 0.409852775321 58 | 0.784702951333529 |
| c | -0.184132172881249 | -0.012030958432748 | -0.110156883654384 | 0.218572247867126 | -0.035325936062005 |
| d | 9.889932879969575 | -3.717956726390 17 | 4.697457085317 6 | 6.648269572084 33 | -3.026502814095 83 |
| f | 1.843813235555315 | -0.643779936629 56 | 0.910418285014 127 | -0.737980772377752 | -0.522687484745 32 |
| g | -2.074844182182 56 | 0.447097638921 85 | -0.959053601554654 | -0.580955761572 24 | 0.378082178902487 |
| h | 9.792700357955 59 | 0.232903741490693 | 3.971290599099 28 | 1.000000000300262 | -1.687553742176 25 |
| i | 0 | 0 | 0 | 0 | 0 |
| j | -1.113514988782 71 | -0.366610117286381 | -0.523183544290 677 | -0.470402400605697 | -1.433789157834 34 |
| k | 1 | 0 | 0 | 0.5 | 0 |
| s | 0 | 0 | 0 | 0 | 0 |
| m | -0.568915141306 53 | -0.106711930503672 | -0.503025809551099 | 1 | -0.748724878178412 |
| n | 16 | 0 | 0 | 20 | 0 |
| o | -4 | 0 | 0 | 0 | 0 |
| p | 2 | 0 | 0 | -4 | 0 |
| q | 11.242208874577 71 | 0.765 | -2.971290599099 28 | -0.105107110464577 | 2.38 |
| α | 2.6875 | -14.25 | 3 | 3.875 | -1.75 |
| β | -0.90625 | 0.125 | -0.5 | 0.4375 | 0.0625 |
| $\gamma^{-1}$ | 1.378714399100 87 | 1.074207336578 23 | 1.031634745737 52 | 0.901983541508 68 | 1.033061782443 71 |
| δ | 1 | $2^{-3}$ | 1 | $2^{-3}$ | $2^{-3}$ |
| ζ | 1 | $2^{-1}$ | 1 | $2^{-2}$ | $2^{-2}$ |
| ex | 28 | 28 | 28 | 28 | 27 |
| ey | 29 | 29 | 30 | 29 | 28 |
| ez | 29 | 29 | 30 | 29 | 28 |
| ew | 27 | 28 | 28 | 27 | 28 |
| e'y | 61 | 62 | 62 | 60 | 61 |
| e'x | 63 | 64 | 63 | 61 | 62 |
| e'w | 63 | 60 | 60 | 61 | 59 |

FIG. 5

SECURE COMPUTATION APPARATUS, SECURE COMPUTATION METHOD, AND PROGRAM

CROSS-REFERENCE TO RELATED APPLICATION

The present application is based on PCT filing PCT/JP2020/001680, filed Jan. 20, 2020, the entire contents of which are incorporated herein by reference.

TECHNICAL FIELD

The present disclosure relates to secure computation.

BACKGROUND ART

In recent years, research on advanced statistics and machine learning using secure computation has been actively performed. However, most of operations thereof include calculation of a group of elementary functions such as a reciprocal, a square root, an exponent, and a logarithm, that go beyond addition, subtraction, and multiplication that are good for secure computation. These are extremely severe obstacles from the viewpoint of making applied research of secure computation flourish. On the other hand, NPL 1 presents a method of calculating a reciprocal, a private divisor division, a square root and a reciprocal thereof, an exponent, and the like.

CITATION LIST

Non Patent Literature

NPL 1: Dai Ikarashi, "Secure Real Number Operations for Secure AI-O(|p|)-Bit Communication and O(I)-Round Right Shift Protocol-", CSS2019, 2019.

SUMMARY OF THE INVENTION

Technical Problem

However, when right shifting or division based on a public value is performed by secure computation, calculation may not be performed correctly due to overflow. On the other hand, when right shift is performed to prevent overflow so that bit allocation to a decimal area is decreased and bit allocation to an integer area is increased, precision is degraded.

The present disclosure has been made in view of these points, and provides a secure computation technology for curbing an overflow while maintaining high precision.

Means for Solving the Problem $x$ is a real number, $[\mu]$ is a secret share value of $\mu$, $n$ is an integer equal to or greater than 1, $t=0, \ldots, n-1$, $u=1, \ldots, n-1$, $f_t(x)$ is a function of the real number $x$, $f'_t(x)$ is an approximation function of the function $f_t(x)$, a secret share value $[f'_0(x)]$ of an approximation function $f'_0(x)$ is $[f'_0(x)]=c_{0,0}+c_{0,1}[x]$, a secret share value $[f'_u(x)]$ of an approximation function $f'_u(x)$ is $[f'_u(x)]=c_{u,0}+c_{u,1}[x]+c_{u,2}[f_0(x)]+\ldots+c_{u,u+1}[f_{u-1}(x)]$, $c_{t,0}$ is a public value, and $c_{t,1}, \ldots, c_{t,n+1}$ are coefficients. In the present disclosure, a secret share value $[f_t(x)-f'_t(x)]$ of $f_t(x)-f'_t(x)$ is obtained through secure computation using a secret share value $[x]$ of the real number $x$, and a secret share value $[f_t(x)-f'_t(x)]_r$ of $(f_t(x)-f'_t(x))_r$ obtained by right-shifting $f_t(x)-f'_t(x)$ by the predetermined number of bits is obtained through secure computation using the secret share value $[f_t(x)-f'_t(x)]$.

Effects of the Invention

In the present disclosure, it is possible to curb an overflow while maintaining high precision.

BRIEF DESCRIPTION OF DRAWINGS

FIG. 5 is a table illustrating calculated parameters regarding each elementary function.

DESCRIPTION OF EMBODIMENTS

Figure 1:
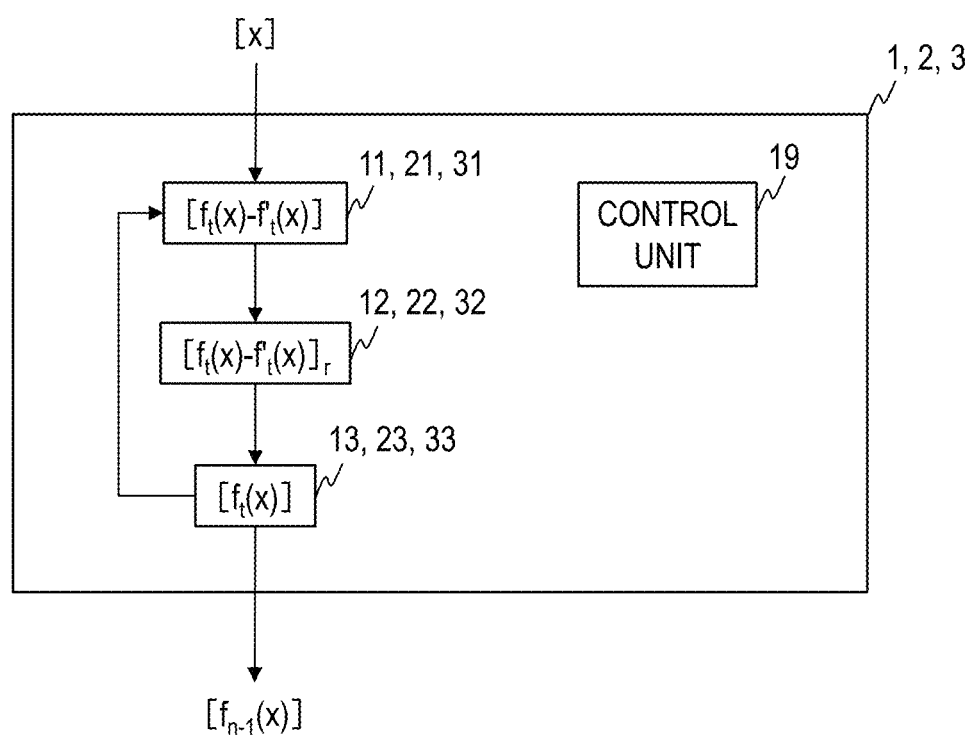
FIG. 1 is a block illustrating a secure computation device of an embodiment.

Hereinafter, embodiments of the present disclosure will be described with reference to the drawings.

In recent years, research on advanced statistics and machine learning using secure computation has been actively performed. However, most of these operations include elementary function calculations such as reciprocals, square roots, exponents, logarithms, and the like that go beyond addition, subtraction, and multiplication that are good for secure computation. Examples of a function approximation method for a basic function such as an elementary function include a Taylor expansion. The Taylor expansion or the like is a polynomial, and any function is approximated by a polynomial so that approximate calculation of the function can be performed by using addition, subtraction, and multiplication that are good for secure computation.

In the following embodiment, any function is approximated by a polynomial function $f_t(x)$, a secret share value $[f_t(x)-f'_t(x)]$ of a difference $f_t(x)-f'_t(x)$ between the function $f_t(x)$ before right shift and the approximation function $f'_u(x)$ of the function $f_t(x)$ is calculated, a secret share value $[f_t(x)-f'_t(x)]_r$ of $(f_t(x)-f'_t(x))_r$ obtained by right-shifting $f_t(x)-f'_t(x)$ is obtained, and a secret share value $[f_t(x)]$ of a function $f_t(x)$ obtained by adding $f'_t(x)$ to $f_t(x)-f'_t(x)$ is obtained through secure computation of the secret share value $[f_t(x)-f'_t(x)]_r$ and the secret share value $[f'_t(x)]$. Here, $x$ is a real number, $[\mu]$ is a secret share value of $\mu$, $n$ is an integer equal to or greater than 1 (for example, $n$ is an integer equal to or greater than 2), $t=0, \ldots, n-1$, $u=1, \ldots, n-1$, $f_t(x)$ is a function of the real number $x$, $f'_t(x)$ is an approximation function of the function $f_t(x)$, a secret share value $[f'_0(x)]$ of an approximation function $f'_0(x)$ is $[f'_0(x)]=c_{0,0}+c_{0,1}[x]$, a secret share value $[f'_u(x)]$ of an approximation function $f'_u(x)$ is $[f'_u(x)]=c_{u,0}+c_{u,1}[x]+c_{u,1}[x]+c_{u,2}[f_0(x)]+\ldots+[f_{u-1}(x)]$, $c_{t,0}$ is a public value, and $c_{t,1}, \ldots, c_{t,n+1}$ are coefficients. Here, $c_{t,1}, \ldots, c_{t,n+1}$ are values with small effective numbers of bits and are values that do not require a shift due to overflow even when $c_{t,1}, \ldots, c_{t,n+1}$ is multiplied. $f_t(x)-f'_t(x)$ is positive. Further, a public decimal point position is defined for an integer on the ring so that this can be regarded as a fixed-point real number. In the embodiment, the fixed-point real number indicated on the ring in this way is simply expressed as a real number. A secret sharing scheme is not limited, and examples thereof include an additive secret sharing scheme and a Shamir's secret sharing scheme. An example of [μ] is a secret share value (share) obtained by performing linear secret sharing on an element μ on a quotient ring.

Here, because magnitude of $f_t(x)-f'_t(x)$ is smaller than that of $f_t(x)$, an overflow of the secret share value $[f_t(x)-f'_t(x)]$ can be curbed. Further, because the secret share value $[f_t(x)-f'_t(x)]$ of the difference $f_t(x)-f'_t(x)$ between the function $f_t(x)$ before right shift and the approximation function $f_u(x)$ of the function $f_t(x)$ is calculated, it is possible to maintain high precision. The overflow is a problem based on performance of a processor in which the secure computation is implemented, and the present scheme provides a scheme for solving a problem based on constraints on this hardware. Thus, this scheme does not solve pure mathematics problems, but solves hardware implementation problems, and therefore, has technical characteristics. For example, technical characteristics of a processor that overflows when the secret share value $[f_t(x)]$ is calculated but does not overflow in calculation of the secret share value $[f_t(x)-f'_t(x)]$ are remarkable.

Hereinafter, each of embodiments will be described.

First Embodiment

The secure computation device 1 of the first embodiment includes secure computation units 11, 12, and 13 and a control unit 19, as illustrated in FIG. 1. The secure computation device 1 of the present embodiment receives the secret share value $[x] \in [L, R)$ of the real number x as an input and performs secure computation to output a secret share value $[f_{n-1}(x)]$ of a target function $f_{n-1}(x)$. Here, L and R are real numbers satisfying L<R, and [L, R) indicates a left-closed, right-open interval of L or more and smaller than R. An example of the function $f_{n-1}(x)$ is a polynomial for approximating an elementary function. Functions that appear in the process of obtaining $f_{n-1}(x)$ are written as $f_0(x), \ldots, f_{n-2}(x)$. Hereinafter, a detailed description will be given with reference to FIG. 2.

Figure 2:
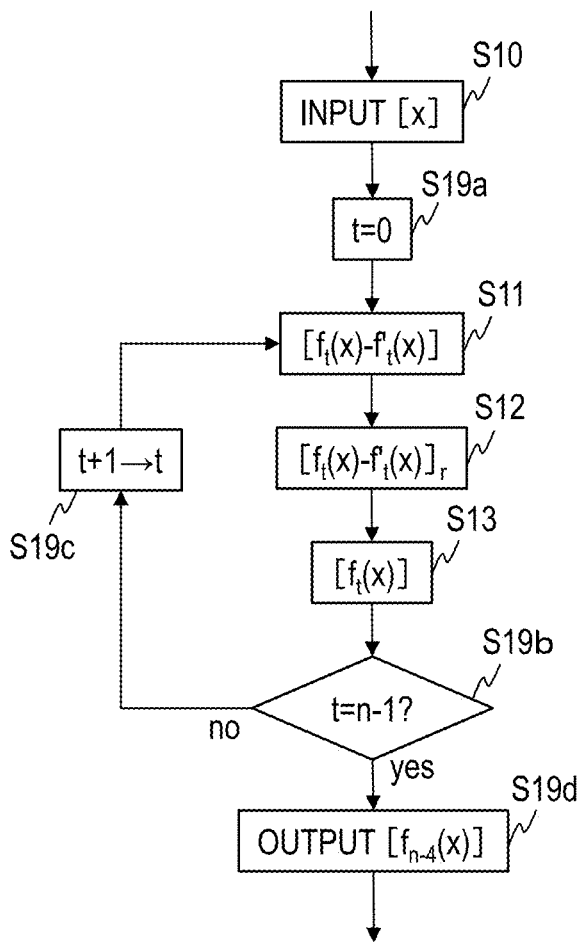
FIG. 2 is a flow diagram illustrating processing of a first embodiment.

As illustrated in FIG. 2, first, the secret share value [x] is input to the secure computation unit 11 of the secure computation device 1 (step S10). Then, the control unit 19 initializes a value of t to t=0 (step S19a).

The secure computation unit 11 uses at least the secret share value [x] to obtain and output a secret share value $[f_t(x)-f'_t(x)]$ of a difference $f_t(x)-f'_t(x)$ between the function $f_t(x)$ and the approximation function $f_u(x)$ of the function $f_t(x)$ through secure computation of a sum of products. Here, $[f'_0(x)]=c_{0,0}+c_{0,1}[x]$, and $[f'_u(x)]=c_{u,0}+c_{u,1}[x]+c_{u,2}[f_0(x)]+\ldots+[f_{u-1}(x)]$ for u=1, …, n−1. For example, when t=0, the secure computation unit 11 uses the secret share value [x], the function $f_0(x)$, $c_{0,0}$ and $c_{0,1}$ to obtain the secret share value $[f_0(x)-f'_0(x)]$. When t=1, …, n−1, the secure computation unit 11 uses the secret share value [x], $[f_0(x)], \ldots, [f_t(x)]$, and $c_{0,0}, c_{0,1}, \ldots, c_{0,t+1}$ to obtain the secret share value $[f_t(x)-f'_t(x)]$ (step S11).

The secret share value $[f_t(x)-f'_t(x)]$ is input to the secure computation unit 12. The secure computation unit 12 obtains and outputs the secret share value $[f_t(x)-f'_t(x)]_r$ of $(f_t(x)-f'_t(x))$, obtained by right-shifting $f_t(x)-f'_t(x)$ by the predetermined number of bits through secure computation using the secret share value $[f_t(x)-f'_t(x)]$. The secure computation of the right shift can be realized by secret computation of division. This lowers a decimal point position of $f_t(x)-f'_t(x)$ to a predetermined digit. This decimal point position is determined in advance (step S12).

The secret share value $[f_t(x)-f'_t(x)]_r$ is input to the secure computation unit 13. The secure computation unit 13 obtains and outputs the secret share value $[f_t(x)]$ of the function $f_t(x)$ through secure computation using the secret share value $[f_t(x)-f'_t(x)]_r$ and the secret share value $[f'_t(x)]$. That is, the secure computation unit 13 obtains the secret share value $[f_t(x)]$ of $f_t(x)-f'_t(x)+f'_t(x)=f_t(x)$ through secure computation of addition using the secret share value $[f_t(x)-f'_t(x)]_r$ and the secret share value $[f'_t(x)]$ (step S13).

The control unit 19 determines whether t=n−1 (step S19b). When it is not that t=n−1, the control unit 19 sets t+1 as a newt and returns the processing to step S11 (step S19c). On the other hand, when t=n−1, the secure computation unit 13 outputs the secret share value $[f_{n-1}(x)]$ (step S19d). That is, every time the secure computation device 1 executes processing operations of steps S11 to S13 of the secure computation units 11 to 13, respectively, for t=0, …, n−2, the secure computation device 1 sets t+1 as a new t, executes processing operations of steps S11 to S13 again, and obtains the secret share value $[f_{n-1}(x)]$.

Second Embodiment

As illustrated in FIG. 1, a secure computation device 2 of a second embodiment includes secure computation units 21, 22, and 23, and a control unit 19. The secure computation device 2 of the second embodiment receives the secret share value $[x] \in [L, R)$ of the real number x as an input and performs secure computation to output a secret share value $[f_{n-1}(x)]$ of a target function $f_{n-1}(x)$. In the second embodiment, an example in which n=3, a, b, c, d, f, g, h, i, j, k, s, m, n, o, p, q, α, β, γ, δ, and ζ are real numbers, $f_0(x)=y=\delta x^2+ax$, $f_1(x)=z=y(\zeta y+b)+cx$, $f_2(x)=w=\gamma(z(\alpha z+d)+y(\beta x+f)+gx)$, $f'_0(x)=ix+j$, $f'_1(x)=ky+sx+m$, and $f'_2(x)=nz+oy+px+q$ will be described. A method of setting the recent functions $f'_0(x)=ix+j$, $f'_1(x)=ky+sx+m$, and $f'_2(x)=nz+oy+px+q$, and specific examples thereof will be described below.

Figure 3:
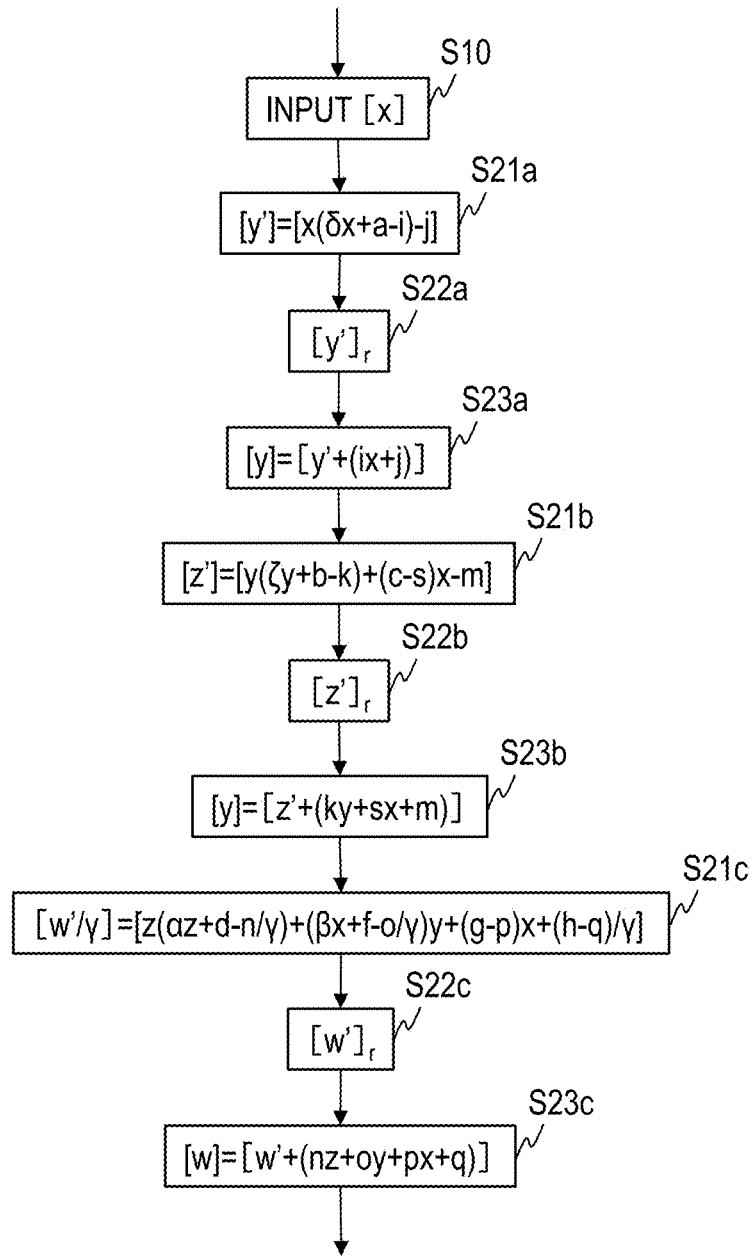
FIG. 3 is a flow diagram illustrating processing of a second embodiment.

As illustrated in FIG. 3, first, the secret share value [x] is input to the secure computation unit 21 of the secure computation device 2 (step S10).

The secure computation unit 21 obtains and outputs a secret share value $[f_0(x)-f'_0(x)]=[y']=[x(\delta x+a-i)-j]$ through secure computation of sum-of-product computation using the secret share value [x] (step S21a).

The secret share value [y'] is input to the secure computation unit 22. The secure computation unit 22 obtains and outputs a secret share value $[y']_r$ of $y'_r$ obtained by right-shifting y' by the predetermined number of bits through secure computation using the secret share value [y'] (step S22a).

The secret share value $[y']_r$ is input to the secure computation unit 23. The secure computation unit 23 obtains and outputs a secret share value $[y]=[y'+(ix+j)]$ through secure computation using the secret share value $[y']_r$ and the secret share value $[f'_0(x)]=[ix+j]$ (step S23a).

The secret share value [y] is input to the secure computation unit 21. The secure computation unit 21 obtains and outputs the secret share value $[f_1(x)-f'_1(x)]=[z']=[y(\zeta y+b-k)+(c-s)x-m]$ through secure computation of sum-of-product computation using the secret share value [x] and the secret share value [y] (step S21b).

The secret share value [z'] is input to the secure computation unit 22. The secure computation unit 22 obtains and outputs a secret share value $[z']_r$ of $z'_r$ obtained by right-shifting z' by the predetermined number of bits through secure computation using the secret share value [z'] (step S22b).

The secret share value [z']$_r$ is input to the secure computation unit 23. The secure computation unit 23 obtains and outputs a secret share value [z]=[z'+(ky+s+m)] through secure computation using the secret share value [z']$_r$ and secret share value [f'$_1$(x)]=[ky+sx+m] (step S23b).

The secret share value [z] is input to the secure computation unit 21. The secure computation unit 21 obtains and outputs a secret share value [w'/γ]=[z(αz+d−n/γ)+(βx+f−o/γ)y+(g−p)x+(h−q)/γ] through secure computation of sum-of-product computation using the secret share value [x], the secret share value [y], and the secret share value [z] (step S21c).

The secret share value [w'/γ] is input to the secure computation unit 22. The secure computation unit 22 obtains and outputs a secret share value [w']$_r$ of w'$_r$ obtained by right-shifting w' obtained by multiplying w'/γ by γ by the predetermined number of bits through secure computation using the secret share value [w'/γ] (step S22c). Processing for obtaining the secret share value [W']$_r$ is not limited. For example, the secure computation unit 22 may obtain a public value $2^σ/γ$ to obtain the secret share value [w']$_r$ through secure computation of public value division [w'/γ]/($2^σ/γ$) using the public value $2^σ/γ$ and the secret share value [w'/γ]. Here, σ is a positive integer indicating an amount of right shift. Thus, because the multiplication of γ and the secure computation of the right shift can be executed at the same time, a processing cost can be reduced.

The secret share value [w'], is input to the secure computation unit 23. The secure computation unit 23 obtains and outputs a secret share value [w]=[w'+(nz+oy+px+q)] through secure computation using the secret share value [w'], and the secret share value [f'$_2$(x)]=[nz+oy+px+q].

Example of Method of Searching for Approximation Function

Hereinafter, a method of searching for an approximation function before right shift will be illustrated.
Input: Interval [L, R), and functions y=δx²+ax, z=y(ζ+b)+cx, and w=γ(z(αz+d)+y(βx+f)+gx)
Set parameters: Minimum search values $i_{min}$, $k_{min}$, $s_{min}$, $n_{min}$, $o_{min}$, and $p_{min}$ of respective discrete coefficients i, k, s, n, o, and p, and maximum search values $i_{max}$, $k_{max}$, $s_{max}$, $n_{max}$, $o_{min}$, $o_{max}$, $p_{min}$, and $p_{max}$ of respective discrete coefficient i, k, s, n, o, and p
Output: Maximum value $M_y$ of approximation functions ix+j and y−(ix+j) of y, maximum value $M_z$ of approximation functions ky+sx+m and z−(ky+sx+m) of z, and maximum value $M_w$ of approximation functions nz+oy+px+q and w−(nz+oy+px+q) of w
1: for i=$i_{min}$ to $i_{max}$ do
2: Calculate a difference between the maximum value and the minimum value in an interval [L, R) of y−ix.
3: Output i at which the difference between the maximum value and the minimum value in the interval [L, R) of y−ix is smallest, a minimum value j of the difference y−ix in this case, and a difference $M_y$ ((maximum value of y−ix)−(minimum value of y−ix), in other words, a width of movement of a function value of y−ix).
4: for each (k, s) ∈{$k_{min}$, . . . , $k_{max}$}×{$s_{min}$, . . . , $s_{max}$} do
5: Calculate a difference between the maximum value and the minimum value in an interval [L, R) of z−(ky+sx).
6: Output (k, s) at which a difference between the maximum value and the minimum value in the interval [L, R) of z−(ky+sx) is smallest, a minimum value m of the difference z−(ky+sx) in this case, and a difference $M_z$ ((maximum value of z−(ky+sx))−(minimum value of z−(ky+sx)), in other words, a width of movement of a function value of z−(ky+sx)).
7: for each (n, o, p) ∈{$n_{min}$, . . . , $n_{max}$}×{$o_{min}$, . . . , $o_{max}$}×{$p_{min}$, . . . , $p_{max}$} do
8: Calculate a difference between the maximum value and the minimum value in an interval [L, R) of z−(nz+oy+px).
9: Output (n, o, p) at which the difference between the maximum value and the minimum value in the interval [L, R) of z−(nz+oy+px) is smallest, a minimum value q of the difference z−(nz+oy+px) in this case, and a difference $M_w$ ((maximum value of z−(nz+oy+px))−(minimum value of z−(nz+oy+px)), in other words, a width of movement of a function value of z−(nz+oy+px)).

Third Embodiment

As illustrated in a third embodiment, the secure computation device 3 of the third embodiment includes secure computation units 31, 32, and 33, and a control unit 19. The secure computation device 3 of the third embodiment receives the secret share value [x] ∈ [L, R) of the real number x as an input and performs secure computation to output a secret share value [f$_{n-1}$i(x)] of a target function f$_{n-1}$(x). In the third embodiment, an example in which n=2, a, b, c, γ, δ, i, j, k, s, and m are real numbers, f$_0$(x)=y=δx²+ax, f$_1$(x)=z=γ(y(δy+b)+cx), f'$_0$(x)=ix+j, and f'$_1$(x)=ky+sx+m will be described.

Figure 4:
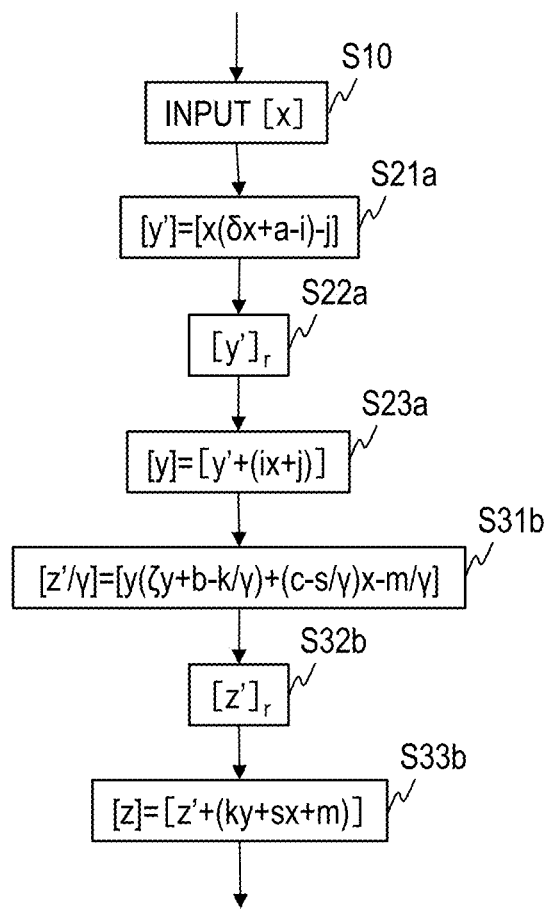
FIG. 4 is a flow diagram illustrating processing of a third embodiment.

As illustrated in FIG. 4, first, the secret share value [x] is input to the secure computation unit 31 of the secure computation device 3 (step S10).

The secure computation unit 31 obtains and outputs a secret share value [f$_0$(x)−f'$_0$(x)]=[y']=[x(δx+a−i)−j] through secure computation of sum-of-product computation using the secret share value [x] (step S21a).

The secret share value [y] is input to the secure computation unit 32. The secure computation unit 32 obtains and outputs a secret share value [y']$_r$ of y'$_r$ obtained by right-shifting y' by the predetermined number of bits through secure computation using the secret share value [y'] (step S22a).

The secret share value [y']$_r$ is input to the secure computation unit 33. The secure computation unit 33 obtains and outputs a secret share value [y]=[y'+(ix+j)] through secure computation using the secret share value [y']$_r$ and the secret share value [f'$_0$(x)]=[ix+j] (step S23a).

The secret share value [y] is input to the secure computation unit 31. The secure computation unit 31 obtains and outputs a secret share value [z'/γ']=[y(ζy+b−k/γ)+(c−s/γ)x−m/γ] through secure computation of sum-of-product computation using the secret share value [x] and the secret share value [y] (step S31c).

The secret share value [z'/γ] is input to the secure computation unit 32. The secure computation unit 32 obtains and outputs a secret share value [z']$_r$ of z'$_r$ obtained by right-shifting z' obtained by multiplying z'/γ by γ by the predetermined number of bits through secure computation using the secret share value [z'/γ] (step S32b). Processing for obtaining the secret share value [z']$_r$ is not limited. For example, the secure computation unit 32 may obtain a public value $2^σ/γ$ to obtain a secret share value [z']$_r$ through secure computation of public value division [z'/γ]/($2^σ/γ$) using the public value $2^σ/γ$ and the secret share value [z'/γ]. Thus, because the multiplication of γ and the secure computation of the right shift can be executed at the same time, a processing cost can be reduced.

The secret share value $[z']_r$ is input to the secure computation unit 33. The secure computation unit 33 obtains and outputs a secret share value $[z]=[z'+(ky+sx+m)]$ through secure computation using the secret share value $[z']_r$ and the secret share value $[f'_1(x)]=[ky+sx+m]$ (step S33b).

Example of Calculated Parameters Regarding Each Elementary Function

FIG. 5 illustrates calculated parameters when the function $f_{n-1}(x)$ is a reciprocal function, a square root function, a reciprocal function of a square root, an exponential function, and a logarithmic function, which are elementary functions. ex, ey, and ez indicate decimal point positions of x, y, and z, respectively. Further, e'x, e'y, and e'z indicate decimal point positions of x', y', and z' before right shift, respectively. These decimal point positions indicate bit positions of the decimal point positions counted from the lower bits. A value indicating this bit position starts from 0, and when an e1-st bit counted from a lower bit indicates 1, a decimal point position is represented as e1.

Hardware Configuration

The secure computation devices 1, 2, and 3 in the respective embodiments are, for example, devices configured by a general-purpose or dedicated computer including a processor (hardware processor) such as a central processing unit (CPU), a memory such as a random-access memory (RAM) and a read-only memory (ROM), and the like executing a predetermined program. This computer may include one processor and memory or may include a plurality of processors and memories. This program may be installed in a computer or may be recorded in a ROM or the like in advance. Further, a part or all of processing units may be configured by using an electronic circuit that implements a processing function alone, instead of an electronic circuit (circuitry) that implements a functional configuration by a program being read, like a CPU. Further, an electronic circuit constituting one device may include a plurality of CPUs.

Figure 6:
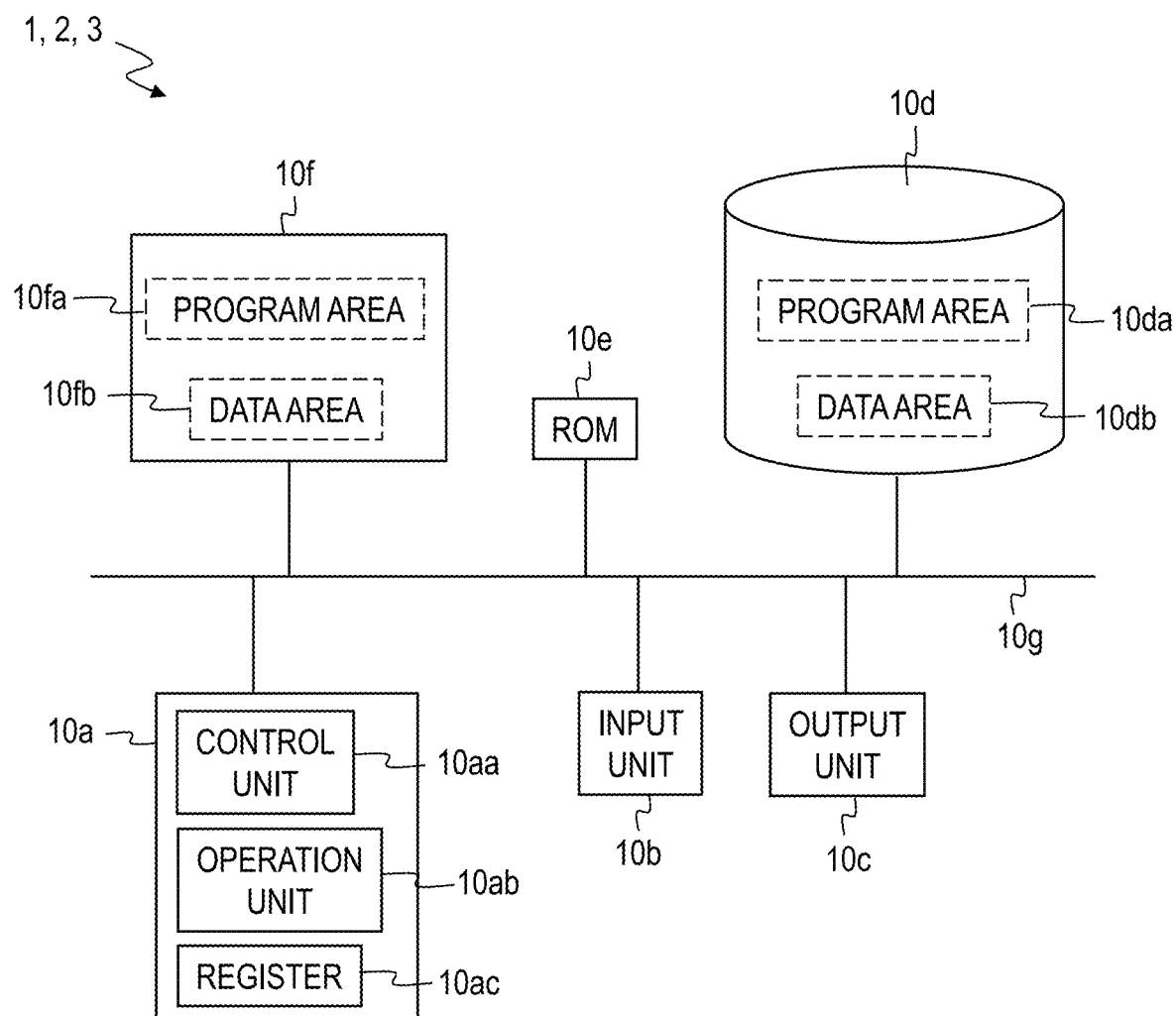
FIG. 6 is a block diagram illustrating a hardware configuration.

FIG. 6 is a block diagram illustrating hardware configurations of the secure computation devices 1, 2, and 3 in the respective embodiments. As illustrated in FIG. 6, the secure computation devices 1, 2, and 3 of this example include a central processing unit (CPU) 10a, an input unit 10b, an output unit 10c, a random access memory (RAM) 10d, a read only memory (ROM) 10e, an auxiliary storage device 10f, and a bus 10g. The CPU 10a of this example includes a control unit 10aa, an operation unit 10ab, and a register 10ac, and executes various pieces of operation processing according to various programs read into the register 10ac. Further, the output unit 10c is an output terminal, a display, or the like on which data is output. Further, the output unit 10c is a LAN card or the like controlled by the CPU 10a that has read a predetermined program. Further, the RAM 10d is a static random access memory (SRAM), a dynamic random access memory (DRAM), or the like, and has a program area 10da in which a predetermined program is stored and a data area 10db in which various types of data is stored. Further, the auxiliary storage device 10f is, for example, a hard disk, a magneto-optical disc (MO), a semiconductor memory, or the like, and has a program area 10fa in which a predetermined program is stored and a data area 10fb in which various types of data is stored. Further, the bus 10g connects the CPU 10a, the input unit 10b, the output unit 10c, the RAM 10d, the ROM 10e, and the auxiliary storage device 10f so that information can be exchanged. The CPU 10a writes the program stored in the program area 10fa of the auxiliary storage device 10f to the program area 10da of the RAM 10d according to a read operating system (OS) program. Similarly, the CPU 10a writes various types of data stored in the data area 10fb of the auxiliary storage device 10f to the data area 10db of the RAM 10d. An address on the RAM 10d in which this program or data is written is stored in the register 10ac of the CPU 10a. The control unit 10ab of the CPU 10a sequentially reads out these addresses stored in the register 10ac, reads a program or data from the area on the RAM 10d indicated by the read address, causes the operation unit 10ab to sequentially execute operations indicated by the program, and stores operation results in the register 10ac. With such a configuration, functional configurations of the secure computation device 1, 2, and 3 are implemented.

The above-described program can be recorded on a computer-readable recording medium. An example of the computer-readable recording medium is a non-transitory recording medium. Examples of such a recording medium are a magnetic recording device, an optical disc, a photomagnetic recording medium, and a semiconductor memory.

Distribution of this program is performed, for example, by selling, transferring, or renting a portable recording medium such as a DVD or CD-ROM on which the program has been recorded. Further, this program may be distributed by being stored in a storage device of a server computer and transferred from the server computer to another computer via a network. As described above, the computer that executes such a program first temporarily stores, for example, the program recorded on the portable recording medium or the program transferred from the server computer in a storage device of the computer. When the computer executes the processing, the computer reads the program stored in the storage device of the computer and executes processing according to the read program. Further, as another form of execution of the program, the computer may directly read the program from the portable recording medium and execute the processing according to the program, and further, the processing according to the received program may be sequentially executed each time the program is transferred from the server computer to the computer. Further, a configuration in which the above-described processing may be executed by a so-called application service provider (ASP) type service that implements a processing function only by an execution instruction and result acquisition without transferring the program from the server computer to the computer. It is assumed that the program in the present embodiment includes information provided for processing of an electronic calculator and being pursuant to the program (such as data that is not a direct command to the computer, but has properties defining processing of the computer).

In each embodiment, although the present device is configured by a predetermined program being executed on the computer, at least a part of processing content of thereof may be implemented by hardware.

Other Modification Examples, and the Like

The present disclosure is not limited to the above-described embodiments. For example, the secure computation devices 1, 2, and 3 of the embodiments obtain the secret share value $[f_t(x)-f'_t(x)]$ of $f_t(x)-f'_t(x)$ through secure computation using the secret share value $[x]$ of the real number x, obtain the secret share value $[f_t(x)-f'_t(x)]_r$ of $(f_t(x)-f'_t(x))_r$ obtained by right-shifting $f_t(x)-f'_t(x)$ by the predetermined number of bits through secure computation using the secret share value $[f_t(x)-f'_t(x)]$, and obtain the secret share value $[f_t(x)]$ of the function $f_t(x)$ through secure computation using the secret share value $[f_t(x)-f'_t(x)]_r$ and the secret share value $[f'_t(x)]$. However, the secret share value $[f_t(x)-f'_t(x)]_r$ may be used for other secure computations before the secret share value $[f_t(x)]$ is obtained.

Although the secure computation unit 11 has obtained the secret share value $[f_t(x)-f'_t(x)]$ through the secure computation of the sum-of-product computation using the secret share value [x] in the above embodiment, the secret share value $[f_t(x)-f'_t(x)]$ may be obtained through secure computation other than the secure computation of the sum-of-product computation.

Further, various types of processing described above may be not only executed in chronological order according to the description but may also be executed in parallel or individually according to a processing capacity of a device that executes the processing or as necessary. In addition, it is obvious that change can be made appropriately without departing from the spirit of the present disclosure.

INDUSTRIAL APPLICABILITY

The present disclosure can be used, for example, for calculation of an elementary function such as a reciprocal function, a square root function, an exponential function, and a logarithmic function in machine learning and data mining performed in secure computation while concealing data.

REFERENCE SIGNS LIST 1, 2, 3 Secure computation device
11, 21, 31, 12, 22, 32, 13, 23, 33 Secure computation unit

The invention claimed is:

1. A secure computation device that curbs overflow in secure computations, wherein x is a real number, [μ] is a secret share value of μ, n is an integer equal to or greater than 1, t=0, . . . , n−1, u=1, . . . , n−1, $f_t(x)$ is a function of the real number x, $f'_t(x)$ is an approximation function of the function $f_t(x)$, a secret share value $[f'_0(x)]$ of an approximation function $f'_0(x)$ is $[f'_0(x)]=c_{0,0}+c_{0,1}[x]$, a secret share value $[f'_u(x)]$ of an approximation function $f'_u(x)$ is $[f'_u(x)]=c_{u,0}+c_{u,1}[x]+c_{u,2}[f_0(x)]+\ldots+c_{u,u+1}[f_{u-1}(x)]$, $c_{t,0}$ is a public value, and $c_{t,1}, \ldots, c_{t,n+1}$ are coefficients, the secure computation device comprising:
first secure computation circuitry configured to obtain a secret share value $[f_t(x)-f'_t(x)]$ of $f_t(x)-f'_t(x)$ through secure computation using a secret share value [x] of the real number x; and
second secure computation circuitry configured to obtain a secret share value $[f_t(x)-f'_t(x)]_r$ of $(f_t(x)-f'_t(x))_r$ obtained by right-shifting $f_t(x)-f'_t(x)$ by the number of bits predetermined through secure computation using the secret share value $[f_t(x)-f'_t(x)]$,
wherein the secret share value [x], the secret share value $[f_t(x)-f'_t(x)]$, and the secret share value $[f_t(x)-f'_t(x)]_r$ are fixed-point real numbers which are implemented in the first secure computation circuitry and the second secure computation circuitry, and the secure computation device curbs overflow in the first secure computation circuitry and the second secure computation circuitry.

2. The secure computation device according to claim 1, further comprising third secure computation circuitry configured to obtain a secret share value $[f_t(x)]$ of the function $f_t(x)$ through secure computation using the secret share value $[f_t(x)-f'_t(x)]_r$ and the secret share value $[f'_t(x)]$.

3. The secure computation device according to claim 1, wherein the first secure computation circuitry obtains the secret share value $[f_t(x)-f'_t(x)]$ through secure computation of sum-of-product computation using the secret share value [x].

4. The secure computation device according to claim 2, wherein n is an integer equal to or greater than 2, and
every time processing operations of the first secure computation circuitry, the second secure computation circuitry, and the third secure computation circuitry are executed for t=0, . . . , n−2, the processing operations, with t+1 as a new t, of the first secure computation circuitry, the second secure computation circuitry, and the third secure computation circuitry are executed again to obtain a secret share value $[f_{n-1}(x)]$.

5. The secure computation device according to claim 2, wherein n=3,
a, b, c, d, f, g, h, i, j, k, s, m, n, o, p, q, α, β, γ, δ, and ζ are real numbers, $f_0(x)=y=\delta x^2+ax$, $f_1(x)=z=y(\zeta y+b)+cx$, $f_2(x)=w=\gamma(z(\alpha z+d)+y(\beta x+f)+gx)$, $f'_0(x)=ix+j$, $f'_1(x)=ky+sx+m$, and $f'_2(x)=nz+oy+px+q$.

6. The secure computation device according to claim 5, wherein the first secure computation circuitry obtains a secret share value $[f_0(x)-f'_0(x)]=[y']=[x(\delta x+a-i)-j]$ through secure computation of sum-of-product computation using the secret share value [x],
the second secure computation circuitry obtains a secret share value $[y']_r$ of $y'_r$ obtained by right-shifting y' by the number of bits predetermined through secure computation using the secret share value [y'],
the third secure computation circuitry obtains a secret share value $[y]=[y'+(ix+j)]$ through secure computation using the secret share value [y'], and the secret share value $[f_0(x)]=[ix+j]$,
the first secure computation circuitry obtains a secret share value $[f_1(x)-f'_1(x)]=[z']=[y(\zeta y+b-k)+(c-s)x-m]$ through secure computation of sum-of-product computation using the secret share value [x] and the secret share value [y],
the second secure computation circuitry obtains a secret share value $[z']_r$ of $z'_r$ obtained by right-shifting z' by the number of bits predetermined through secure computation using the secret share value [z'],
the third secure computation circuitry obtains a secret share value $[y]=[z'+(ky+sx+m)]$ through secure computation using the secret share value $[z']_r$ and the secret share value $[f'_1(x)]=[ky+sx+m]$,
the first secure computation circuitry obtains a secret share value $[w'/y]=[z(\alpha z+d-n/\gamma)+(\beta x+f-o/\gamma)y+(g-p)x+(h-q)/y]$ through secure computation of sum-of-product computation using the secret share value [x], the secret share value [y], and the secret share value [z],
the second secure computation circuitry obtains a secret share value $[w']_r$ of $w'_r$ obtained by right-shifting w' obtained by multiplying w'/γ by γ by the number of bits predetermined through secure computation using the secret share value $[w'/\gamma]$, and the third secure computation circuitry obtains a secret share value $[w]=[w'+(nz+oy+px+q)]$ through secure computation using the secret share value $[w']_r$ and the secret share value $[f'_2(x)]=[nz+oy+px+q]$.

7. The secure computation device according to claim 6, wherein σ is a positive integer, and the second secure computation circuitry obtains a public value $2^\sigma/\gamma$, and obtains the secret share value $[w']_r$ through secure computation of public value division $[w'/\gamma]/(2^\sigma/\gamma)$ using the public value $2^\sigma/\gamma$ and the secret share value $[w'/\gamma]$.

8. The secure computation device according to claim 2, wherein n=2, a, b, c, γ, δ, i, j, k, s, and m are real numbers, $$f_0(x)=y=\delta x^2+ax,$$

$$f_1(x)=z=\gamma(y(\delta y+b)+cx),$$

$$f'_0(x)=ix+j, \text{ and}$$

$$f'_1(x)=ky+sx+m.$$

9. The secure computation device according to claim 8, wherein the first secure computation circuitry obtains a secret share value $[f_0(x)-f'_0(x)]=[y']=[x(\delta x+a-i)-j]$ through secure computation of sum-of-product computation using the secret share value $[x]$, the second secure computation circuitry obtains a secret share value $[y']_r$ of $y'_r$ obtained by right-shifting y' by the number of bits predetermined through secure computation using the secret share value $[y']$, the third secure computation circuitry obtains a secret share value $[y]=[y'+(ix+j)]$ through secure computation using the secret share value $[y']_r$ and the secret share value $[f'_0(x)]=[ix+j]$, the first secure computation circuitry obtains a secret share value $[z'/\gamma]=[y(\zeta y+b-k/\gamma)+(c-s/\gamma)x-m/\gamma]$ through secure computation of sum-of-product computation using the secret share value $[x]$ and the secret share value $[y]$, the second secure computation circuitry obtains a secret share value $[z']_r$ of $z'_r$ obtained by right-shifting z' obtained by multiplying z'/γ by γ by the number of bits predetermined through secure computation using the secret share value $[z'/\gamma]$, and the third secure computation circuitry obtains a secret share value $[z]=[z'+(ky+sx+m)]$ through secure computation using the secret share value $[z']_r$ and the secret share value $[f'_1(x)]=[ky+sx+m]$.

10. The secure computation device according to claim 9, wherein σ is a positive integer, and the second secure computation circuitry obtains a public value $2^\sigma/\gamma$, and obtains the secret share value $[z']_r$ through secure computation of public value division $[z'/\gamma]/(2^\sigma/\gamma)$ using the public value $2^\sigma/\gamma$ and the secret share value $[z'/\gamma]$.

11. A secure computation method to curb overflow in secure computations, wherein x is a real number, [a] is a secret share value of μ, n is an integer equal to or greater than 1, t=0, . . . , n−1, u=1, . . . , n−1, $F_t(x)$ is a function of the real number x, $f'_t(x)$ is an approximation function of the function $f_t(x)$, a secret share value $[f_0(x)]$ of an approximation function $f'_0(x)$ is $[f'_0(x)]=c_{0,0}+c_{0,1}[x]$, a secret share value $[f'_u(x)]$ of an approximation function $f'_u(x)$ is $[f'_u(x)]=c_{u,0}+c_{u,1}[x]+c_{u,2}[f_0(x)]+ \ldots +c_{u,u+1}[f_{u-1}(x)]$, $c_{t,0}$ is a public value, and $c_{t,1}, \ldots , c_{t,n+1}$ are coefficients, the secure computation method, performed by processing circuitry, comprising:

obtaining a secret share value $[f_t(x)-f'_t(x)]$ of $f_t(x)-f'_t(x)$ through secure computation using a secret share value $[x]$ of the real number x; and obtaining a secret share value $[f_t(x)-f'_t(x)]_r$ of $(f_t(x)-f'_t(x))_r$ obtained by right-shifting $f_t(x)-f'_t(x)$ by the number of bits predetermined through secure computation using the secret share value $[f_t(x)-f'_t(x)]$, wherein the secret share value $[x]$, the secret share value $[f_t(x)-f'_t(x)]$, and the secret share value $[f_t(x)-f'_t(x)]_r$ are fixed-point real numbers which are implemented in the processing circuitry, and the secure computation method curbs overflow in the processing circuitry.

12. A non-transitory computer-readable recording medium storing a program for causing a computer to execute processing according to claim 11.

* * * * *